3,060,085
EXTERMINATION OF UNDESIRED FISHES
Heinz Frensch and Helmut Goebel, Frankfurt am Main, and Maximilian Czech, Hofheim (Taunus), Germany, assignors to Farbwerke Hoechst Aktiengesellschaft vormals Meister Lucius & Brüning, Frankfurt am Main-Hoechst, Germany, a company of Germany
No Drawing. Filed June 14, 1960, Ser. No. 35,886
Claims priority, application Germany June 19, 1959
3 Claims. (Cl. 167—46)

Attempts made in various countries to intensify fish breeding heretofore encountered the difficulty of removing completely and within a short time, above all in larger bodies of water, such as rivers and lakes, undesired or too old or degenerated fishes. In waters with thick silt layers this problem is extremely difficult. As shown in practice, intense mechanical catching does not liberate the waters from fishes within the short period of time required.

The idea of using chemical products for killing undesired fish stocks is not novel. It could, however, not practically be realized since the chemicals used decomposed too slowly in water, fish food organisms were likewise killed and the fish flavor was so strongly impaired that the fishes could no more industrially be used. The composting of fish in large quantities is likewise difficult with regard to the molestation occurring due to bad odor. For practical reasons the chemical substance once added to the water should be completely decomposed at the latest after 4 weeks.

It is already known that 1,2,3,4,7,7-hexachlorobicyclo-[2,2,1]-heptene-(2) shows a certain toxicity to fishes. This is, however of no practical importance since this compound does not meet with the requirements for an ichthyocidal agent. Furthermore, it is known from German patent No. 963,282, that compounds of the type of hexachlorobicyclo - [2,2,1] - heptene - (2) - bis - oxymethylene-(5,6)-sulfite are appropriate for combatting fungous and animal parasites.

Now we have found that substances characterized by their content of 1,2,3,4,7,7-hexachlorobicyclo-[2,2,1]-heptene-(2)-bis-oxymethylene-(5,6)-sulfite are particularly suitable for killing undesired fish stocks. The toxic concentrations for the various kinds of fish amount on an average to 0.01 to 0.1 p.p.m.

The substances to be used are so extraordinarily active that it is now possible to exterminate undesired fish in an economical manner from large bodies of water. The practical extermination of fish stocks in large bodies of waters is carried out in such a way that a solution of the preparation is allowed to flow in, in a certain amount of cubic meters per hour, by means of a pump system and a distributing tube applied over the water inflow. It is of advantage to allow an amount of solution to flow in that causes the highest speed of water connected with the highest possible natural or artificial whirling of the water. This guarantees a rapid and sufficiently effective distribution of the preparation.

For the purpose in question the preparation can be used as wettable powder or, even more advantageously, in the form of an emulsion. Emulsions with a high content of active substance are of unlimited stability as shown by the following example.

50% of 1,2,3,4,7,7-hexachlorobicyclo-[2,2,1]-heptene-(2)bis-oxymethylene-(5,6)-sulfite,
10% of oxethylated nonylphenol as emulsifier,
38% of isopropyl alcohol,
2% of epichlorhydrin as stabilizer.

On storing, this emulsion concentrate need be protected only against frost. Instead of isopropyl alcohol, xylene may likewise be used.

The preparation introduced into the water is chemically and bacterially degradated surprisingly fast. Generally, this process is terminated after 10 to 16 days. On degradation, the non-toxic diol of the following formula

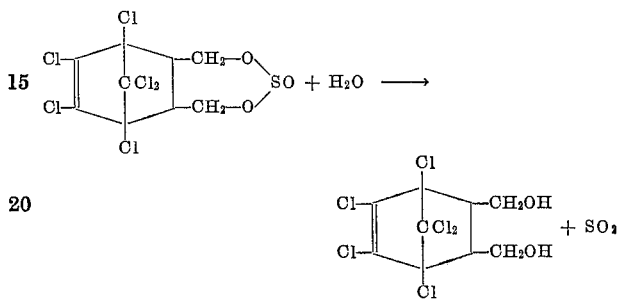

is formed from the above-mentioned active substance. After degradation has taken place, new fishes can be put into the purified water without any risk.

Of considerable importance for the use of the preparation concerned is the question whether the flavor of the killed fishes is impaired. Laboratory tests with fishes treated with 100 times the amount of the indicated concentration limit showed that, when making up the killed fishes into fodder meal, the flavor was not impaired. Rats that were given such fodder meal took it as well as the fodder of untreated fish and likewise did not show any toxic reaction.

The following examples serve to illustrate the invention but they are not intended to limit it thereto:

*Example 1*

When adding an emulsion containing 25% of 1,2,3,4,7,7 - hexachlorobicyclo - [2,2,1] - heptene - (2) - bis - 5,6-oxymethylene-sulfite, 10% of oxethylated nonylphenol as emulsifier and 2% of epichlorhydrin as stabilizer, the rest being xylene, to large bodies of water, all types of fishes inhabiting the water, for example carps, whitings and pikes are reliably injured and killed by a very small dose of active substance, i.e. of 0.04 p.p.m.

*Example 2*

When introducing into an allround glass aquarium filled with water of 10.1° of German hardness and containing carps (*Cyprinus carpio*), dwarf sheat-fish (*Amiurus nebulosus*) and larvae of river-lampreys (*Lampreta fluviatilis*) 0.02 p.p.m. of 1,2,3,4,7,7-hexachlorobicyclo-[2,2,1]-heptene-(2)-bis-5,6-oxymethylene-sulfite in the form of an emulsion concentrate of 50% strength and of the composition mentioned above, the afore-mentioned types of fishes are killed within 12 hours. When taking fishes showing partial injury out of the water containing the preparation and introducing them into fresh tap water, they do not recover, the injury being irreversible. Furthermore, it is of importance that fish food organisms, in the present case water-fleas (Daphnia spec.), tubificids and trichopterae are not killed.

We claim:
1. A method of exterminating fish which comprises adding to water inhabited by said fish an ichthyocidal amount of 1,2,3,4,7,7-hexachlorobicyclo-[2,2,1]-heptene-(2)-bis-5,6-oxymethylene-sulfite.
2. A method of exterminating fish which comprises adding 1,2,3,4,7,7-hexachlorobicyclo-[2,2,1]-heptene-(2)-bis-5,6-oxymethylene-sulfite to water inhabited by said fish in a concentration of about 0.01 to 0.1 p.p.m.
3. A method of exterminating fish which comprises adding to water inhabited by said fish an ichthyocidal amount of an emulsion of 1,2,3,4,7,7-hexachlorobicyclo-[2,2,1]-heptene-(2)-bis-5,6-oxymethylene-sulfite in a member of the group consisting of isopropyl alcohol and xylene.

References Cited in the file of this patent
FOREIGN PATENTS
963,282 Germany _____ May 1957